(12) United States Patent
Simpson

(10) Patent No.: US 12,458,087 B2
(45) Date of Patent: Nov. 4, 2025

(54) HEADBAND WITH DROP-DOWN SUNGLASSES

(71) Applicant: Sean Simpson, Lexington, KY (US)

(72) Inventor: Sean Simpson, Lexington, KY (US)

( * ) Notice: Subject to any disclaimer, the term of this patent is extended or adjusted under 35 U.S.C. 154(b) by 0 days.

(21) Appl. No.: 18/638,288

(22) Filed: Apr. 17, 2024

(65) Prior Publication Data

US 2025/0325055 A1    Oct. 23, 2025

(51) Int. Cl.
*G02C 3/02* (2006.01)
*A41D 20/00* (2006.01)

(52) U.S. Cl.
CPC ............... *A41D 20/00* (2013.01); *G02C 3/02* (2013.01)

(58) Field of Classification Search
CPC .................................. A41D 20/00; G02C 3/02
See application file for complete search history.

(56) References Cited

U.S. PATENT DOCUMENTS

| | | | | |
|---|---|---|---|---|
| 3,226,729 | A * | 1/1966 | Faucci | G02C 7/16 2/13 |
| 4,520,510 | A * | 6/1985 | Daigle | G02C 3/003 2/454 |
| 4,616,367 | A * | 10/1986 | Jean, Jr. | A61F 9/025 2/452 |
| 4,712,254 | A * | 12/1987 | Daigle | A41D 20/00 2/454 |
| 4,811,430 | A * | 3/1989 | Janusz | A61F 9/027 2/454 |
| 5,920,371 | A * | 7/1999 | Chang | G02B 27/0176 351/158 |
| 10,722,403 | B2 * | 7/2020 | Saladino | A61F 9/029 |
| 2014/0033397 | A1 * | 2/2014 | Schwantes | A41D 20/00 2/209.13 |

* cited by examiner

*Primary Examiner* — Tajash D Patel
(74) *Attorney, Agent, or Firm* — Stockwell & Smedley, PSC

(57) ABSTRACT

An eyeglasses and headband combination apparatus including a headband having a pocket defined therein, and eyeglasses attached to the headband by a connection that enables the eyeglasses to be alternately movable from being stored in the pocket and to being extended from the pocket without detaching the eyeglasses from the headband.

16 Claims, 4 Drawing Sheets

HEADBAND WITH DROP-DOWN SUNGLASSES

FIELD OF THE INVENTION

The invention relates to headgear which can be used in combination with eyeglasses to form an eyeglasses and headgear combination apparatus, and more particularly, to an eyeglasses and headband combination apparatus, and even more particularly to a headband with drop-down sunglasses.

BACKGROUND OF THE INVENTION

People engage in a wide variety of physical activities while wearing eyeglasses, either sunglasses or prescription lenses. Headgear, including headbands, caps, sweatbands or the like, are often worn during the such physical activity for the comfort of the user. People often desire or need to wear eyeglasses at the same time they are wearing the headgear. The eyeglasses may be sunglasses, prescription eyeglasses or protective eyewear.

On the recreational side, people often use sweatbands and sunglasses in sports activities involving perspiration and conducted outdoors, such as jogging, biking, rowing, tennis and the like. Similarly, mountain climbing, horseback riding, canoeing, kayaking, and other activities involve exertion and require that eyeglasses be held stable during the activity.

On the vocational side, people could often use an accessory that provides stability of the eyeglasses and, at the same time, protection from perspiration interfering with the vision. For example, professionals as disparate as surgeons and iron workers have a need to be assured that their eyeglasses remain in the proper position while they work.

Present eyeglasses and headgear typically function only independent of each other. The eyeglasses are purchased at specialty shops and selected according to the taste and preferences of the user. Headbands, ear warmers, sweatbands, goggles and other headgear are purchased separately from eyeglasses according to the needs, tastes, and desires of the user. When used simultaneously, the user would usually put on the eyeglasses first and then place the headgear over the eyeglasses. Should the person need to remove the eyeglasses, such as for cleaning, adjusting or walking from the outside sunshine into the inside, it is often necessary first to remove the headgear, or store the glasses someplace, which invariably increases the possibility that the glasses are damaged, forgotten or stolen. The headgear may also interfere with the user putting the eyeglasses back on. The option of using 'flip-ups' sunglasses traditionally used by baseball players is not attractive to users who do not want the bulky sunglass lens pointing out perpendicular to their forehead when in the 'up' position. Whereas 'flip-ups' are handy for baseball players who need to make immediate changes from the up position to the down position, flip-ups are prone to breakage and making the user look awkward and/or funny. Further, flip-ups are prone to breakage and therefore not desirable to users who frequent the outdoors and want a reliable retractable sunglass apparatus that is fashionable, comfortable and convenient to use.

A further disadvantage is that the headgear may contact the eyeglasses, creating discomfort on the part of the user which is not present when the headgear is not in use. Conversely, the eyeglasses may interfere with the function and use of the headgear. Also, traditional eyeglasses may irritate the backs of the ears and, in an active sports setting, may not remain securely in place, often sliding down the nose or even falling off.

Thus, in view of the above, there is a long-felt need to address the aforementioned inefficiencies and inadequacies. Further limitations and disadvantages of conventional and traditional approaches will become apparent to one of skill in the art through comparison of described methods and systems disclosed herein.

SUMMARY OF THE INVENTION

The invention has many important advantages overcoming the deficiencies cited above, among other things. Some embodiments of the invention are directed to a combination headgear and eyeglasses which enables the eyeglasses to be stored within the headgear in a configuration that makes the eyeglasses easily accessible from storage to be specifically positioned with respect to the eyes and nose to be comfortable for the user.

Some embodiments of the invention are directed to an eyeglasses and headband combination apparatus comprising: a headband having a body with an annular shape which is configured and dimensioned to be worn on the head of a user, wherein the headband includes a circumferential pocket formed by an opening in the body, the pocket having an interior pocket wall and cavity, the interior pocket wall having one or more grommets therein; an eyeglasses attachable to the headband by one or more connectors, each of the one or more connectors having an elongated body defining a first end and a second end, the first end opposing the second end, the first end of each of the one or more connectors being attached to at least one of a bridge position defined on the eyeglasses, a first lens position defined on the eyeglasses and a second lens position defined on the eyeglasses, the elongated body of each of the one or more connectors extending through the grommet, wherein the one or more connectors are alternately movable through the grommet to a first condition whereby the eyeglasses are stored in the pocket, and to a second condition whereby the eyeglasses are extended from the pocket, wherein the second end of each of the one or more connectors is secured to the grommet whereby each of the one or more connectors is non-removable from headband.

In some embodiments, the eyeglasses are movable along the elongated body of the one or more connectors.

In some embodiments of the eyeglasses and headband combination apparatus, the second end is of a greater diameter than the grommet and the elongated body.

In some embodiments of the eyeglasses and headband combination apparatus, the first end of the one or more connectors is non-permanently attached with the at least one of a bridge position defined on the eyeglasses, a first lens position defined on the eyeglasses and a second lens position defined on the eyeglasses.

In some embodiments of the eyeglasses and headband combination apparatus, the first end of the one or more connectors is permanently attached with the at least one of a bridge position defined on the eyeglasses, a first lens position defined on the eyeglasses and a second lens position defined on the eyeglasses In some embodiments of the eyeglasses and headband combination apparatus, the body of the headband has a first axial width and a second axial width, the first axial width being in a portion of the body with the pocket, the second axial width being in a remaining portion of the body, wherein the first axial width is greater than the second axial width.

In some embodiments, the eyeglasses and headband combination apparatus further includes a second pocket. The second pocket may be a storage pocket accessible on a surface of the headband.

In some embodiments, the eyeglasses and headband combination apparatus further includes an area defined on a surface of the headband for indicia to be disposed thereon. The indicia may include text or graphics, such as for promotional or marketing purposes.

Some other embodiments of the invention are directed to an eyeglasses and headgear combination apparatus comprising: a headgear having a body configured and dimensioned to be worn by a user, wherein the headgear includes a pocket formed in the body defining a first wall and a second wall, the second wall having one or more grommets therein; eyeglasses attachable to the headgear, the eyeglasses including a bridge position defined on the eyeglasses, a first lens position defined on the eyeglasses and a second lens position defined on the eyeglasses; and one or more connectors, each of the one or more connectors having an elongated body defining a first end and a second end, the first end opposing the second end, the first end of each of the one or more connectors being attached to at least one of the bridge position, the first lens position and the second lens position, the elongated body of each of the one or more connectors extending through the grommet, the second end being of a greater diameter than the grommet and the elongated body, wherein the elongated body is alternately movable through the grommet to a first condition whereby the eyeglasses are stored in the pocket, and to a second condition whereby the eyeglasses are extended from the pocket, wherein the second end of each of the one or more connectors is secured to the grommet whereby each of the one or more connectors is non-removable from headgear.

In some embodiments, the first end of the one or more connectors is non-permanently attached with the at least one of a bridge position defined on the eyeglasses, a first lens position defined on the eyeglasses and a second lens position defined on the eyeglasses.

In some embodiments, the first end of the one or more connectors is permanently attached with the at least one of a bridge position defined on the eyeglasses, a first lens position defined on the eyeglasses and a second lens position defined on the eyeglasses.

In some embodiments, the headgear comprises a headband. The headband body may be annular. The headband body may have a first axial width and a second axial width, the first axial width being in a portion of the body with the pocket, wherein the first axial width is greater than the second axial width.

Some embodiments of the invention eyeglasses and headband combination apparatus comprising: a headband having a body with an annular shape being configured and dimensioned to be worn on the head of a user, the annular shape defining an upper rim and a lower rim, wherein the body includes a pocket with a circumferential opening thereto in the lower rim, the pocket having an interior wall defining a cavity therein, the interior wall having a liner with one or more grommets; eyeglasses attachable to the headband, the eyeglasses including a bridge position defined on the eyeglasses, a first lens position defined on the eyeglasses and a second lens position defined on the eyeglasses; and one or more connectors, each of the one or more connectors having an elongated body defining a first end and a second end, the first end opposing the second end, the first end of each of the one or more connectors being permanently attached to at least one of a bridge position defined on the eyeglasses, a first lens position defined on the eyeglasses and a second lens position defined on the eyeglasses, the elongated body of each of the one or more connectors extending through the grommets, the second end being of a greater diameter than the grommet and the elongated body, wherein the elongated body is alternately movable through the grommet to a first condition whereby the eyeglasses are stored in the pocket, and to a second condition whereby the eyeglasses are extended from the pocket, wherein the second end of each of the one or more connectors is secured to the grommet whereby each of the one or more connectors is non-removable from headband, and wherein the headband has a first width and a second width, the first width being in a portion of the body with the pocket, wherein the first width is greater than the second width.

In some embodiments the headband is constructed of a material having a property of being water absorbent.

In some embodiments, the headband is constructed of a material having a property of being elastic.

In some embodiments, the eyeglasses are polarized.

In some embodiments, the combination includes an area defined on an outer surface of the portion of the headband with the pocket for indicia to be disposed thereon.

Yet other objects and advantages of the invention will become readily apparent to those skilled in the art, following the detailed description, wherein various presently preferred and exemplary embodiments of the invention are shown and described. As discussed herein, the invention is capable of other and different embodiments, and its several details are capable of modifications in various obvious respects, all without departing from the scope of the invention. Accordingly, the drawings and description thereof are to be regarded as illustrative in nature, and not as restrictive.

BRIEF DESCRIPTION OF THE DRAWINGS

These and other aspects of the systems and methods of the invention will become more readily apparent to those having ordinary skill in the art from the following description of an exemplary embodiment of the invention taken in conjunction with the accompanying drawings, wherein various elements are not to scale so as to show like reference numerals may refer to like parts.

DETAILED DESCRIPTION OF SOME EMBODIMENTS OF THE INVENTION

Figure 1:
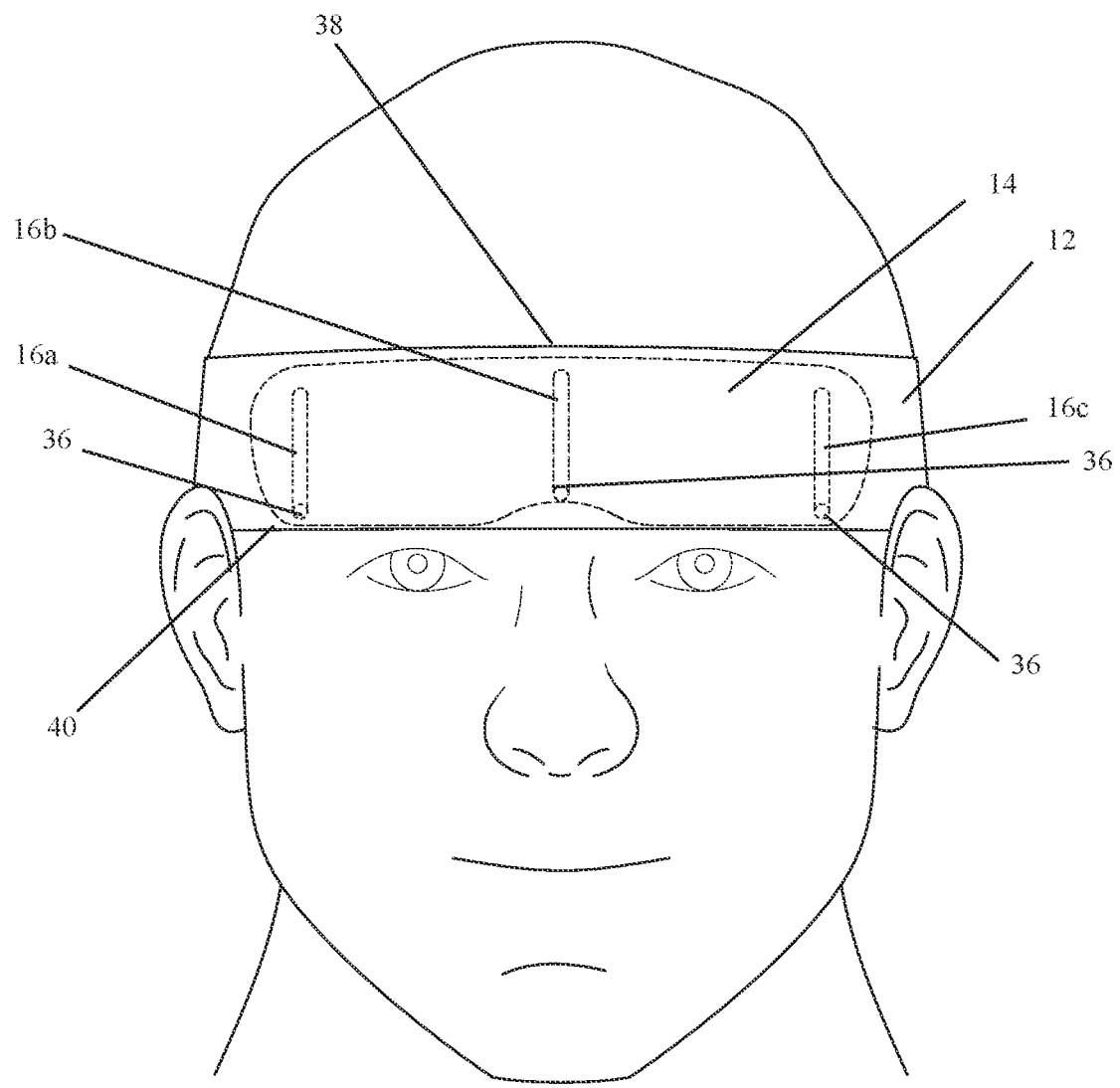
FIG. 1 is a front view of a headband and eyeglasses combination apparatus constructed in accordance with some exemplary embodiments of the invention, illustrating the eyeglasses being stored in the pocket of the headband while the apparatus worn by a user.
Figure 2:
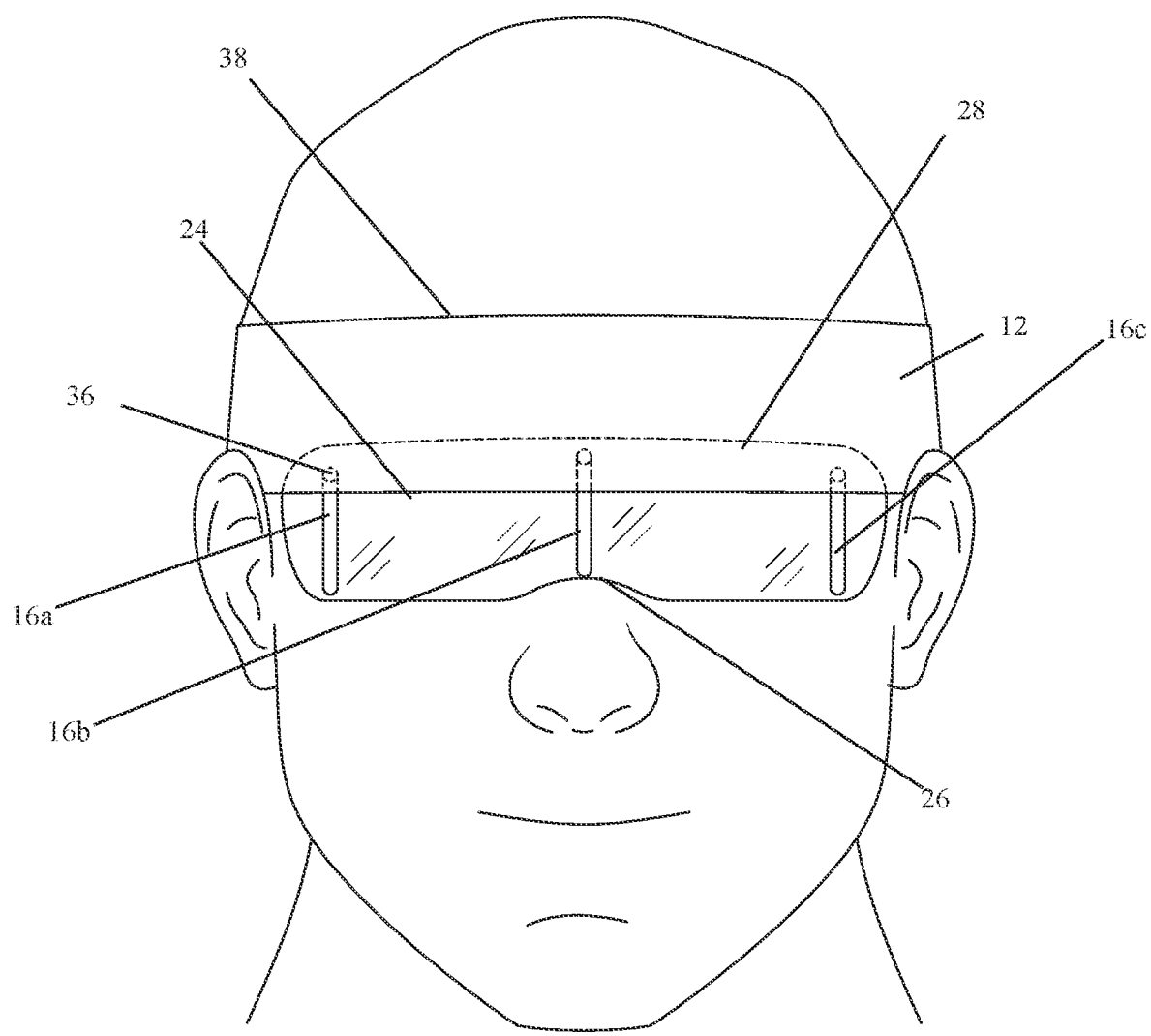
FIG. 2 is another front view of the apparatus of FIG. 1, illustrating the eyeglasses being partially extended from the pocket while the apparatus is worn by a user.
Figure 3:
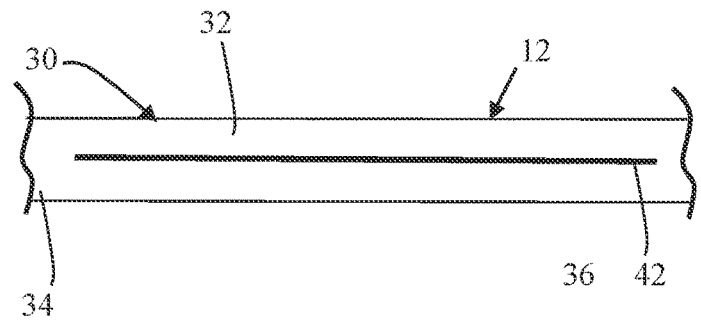
FIG. 3 illustrates a partial cross-sectional view of the headband of FIG. 1 without eyeglasses being connected thereto.
Figure 4:
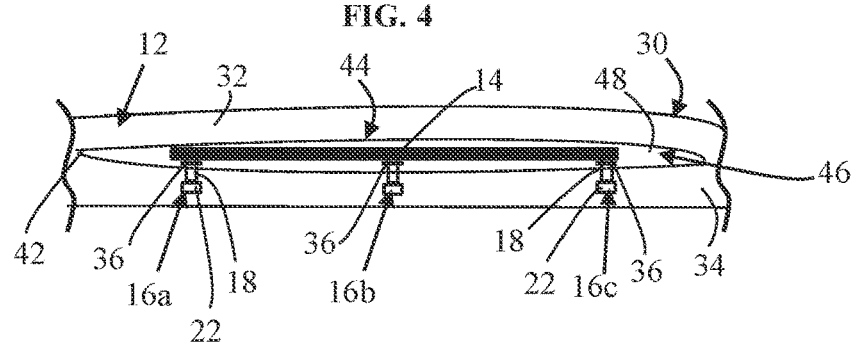
FIG. 4 illustrates a partial cross-sectional view of the headband of FIG. 1, depicting the pocket being opened and eyeglasses being stored in the pocket.
Figure 5:
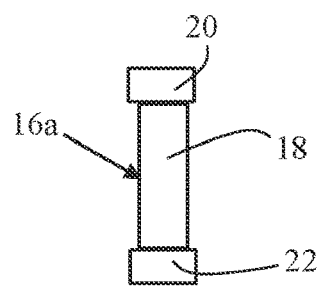
FIG. 5 illustrates a connector used to attach eyeglasses to the headband of FIG. 1.

The invention may be best understood with reference to the detailed figures and description set forth herein. In this description, various aspects of selected embodiments are described. However, it will be apparent to those of ordinary skill in the art and others that alternate embodiments may be practiced with only some or all of the aspects. In some instances, well-known features are omitted or simplified in order not to obscure the illustrated embodiments. Thus, those skilled in the art will readily appreciate that the detailed descriptions provided herein with respect to the figures are merely for explanatory purposes, as the methods and systems may extend beyond the described embodiments. For instance, the teachings presented, and the needs of a particular application, may yield multiple alternative and suitable approaches to implement the functionality of any detail described herein. Therefore, any approach may extend beyond certain implementation choices in the disclosed embodiments.

FIGS. 1-5 illustrate a combined headband and eyeglasses apparatus generally referred to by the numeral 10. Apparatus 10 includes a headband 12 and an eyeglasses 14. Eyeglasses 14 is connected with headband 12 by sliding connectors 16a, 16b and 16c, though other connection methods may be employed within the spirit and scope of the invention.

It should be readily apparent that more or less than three sliding connectors 16a, 16b and 16c may be used. In this embodiment, each of the sliding connectors 16a, 16b and 16c is an elongated strip of rigid but deformable material connected with headband 12 and eyeglasses 14. Sliding connectors 16a, 16b and 16c are generally spaced apart at equidistant positions relative to one another.

Each connector 16a, 16b and 16c consists of an elongated body 18 having a first end 20 and opposing second end 22.

The first end 20 of connector 16a is secured to eyeglasses 14 at a position in the lens referred to herein as a first lens position 24 of eyeglasses 14. For example, first lens position 24 may be located at the portion of the lens near the right or left eye. The first end 20 of connector 16b is secured to eyeglasses 14 at a bridge position 26 of eyeglasses 14. The first end 20 of connector 16c is secured to eyeglasses 14 at a second lens position 28. For example, second lens position 28 may be located at the portion of the lens near the right or left eye opposing first lens position 24. Bridge portion 26 is positioned between the opposing first lens 24 and second lens 28. For example, bridge position 26 may be located at the bridge of eyeglasses 14.

In this embodiment, each first end 20 is secured at a generally lower portion of eyeglasses 14 relative to headband 12, such as at a position adjacent to the bottom half of eyeglasses or adjacent to the bottom peripheral edge of first lens 24, bridge portion 26 and second lens 28, respectively.

Headband 12 includes a body 30 having a pocket 44 defined therein. Pocket 44 is formed by an opening 42 which extends into body 30 to form first pocket wall 32 and a second pocket wall 34. First pocket wall 32 and second pocket wall 34 oppose one another and define a cavity or space 46 therebetween. Each second end 22 of connectors 16a, 16b and 16c extends through a grommet 36 defined in pocket 44, such as in the second pocket wall 34 of body 30.

Grommets 36 are positioned in body 30 to correspond with the locations of first end 20 such that connector body 18 extends generally axially through opening 42 between headband 12 and eyeglasses 14.

Each connector 16a, 16b and 16c may be secured at second end 22 by having an end portion that is of a larger size, such as a larger diameter, than the size (or diameter) of the opening formed by grommet 36 and the size or diameter of body 18. This allows body 18 to slide through grommet 36 while preventing each connector from detaching by second end 22 limiting movement from the engagement with grommet 36. It should be understood that first end 20 may include a variety of fastening mechanisms for forming a permanent or non-permanent engagement. For example, in some embodiments eyeglasses 14 include grommets (not shown) and first end 20 may be of a larger diameter or size than the grommet. In other embodiments, first end 20 includes a hook, hoop or loop than can be tightened on eyeglasses 14 to secure eyeglasses 14.

In this embodiment, headband 12 has a generally annular body 30 which defines opposing rims at a first edge 38 and a second edge 40. Second edge 40 includes an opening 42 to the pocket 44 formed in body 30. Space 46 which is configured and adapted to accommodate eyeglasses 14 therein.

Eyeglasses 14 may be physically moved from storage in space 46 of pocket 44 by moving eyeglasses 14 through opening 42 with connectors 16a, 16b and 16c also moving or sliding through grommets 36. To return eyeglasses 14 to space 46 in pocket 44, eyeglasses 14 may be physically moved from outside of pocket 44, such as in position on a user's face, through opening 42 in second edge 40 and into space 46, with connectors 16a, 16b and 16c moving or sliding through grommets 36 and into the space 46 defined by pocket 44. In some embodiments, some or all of the interior surface 48 of first wall 32 and second wall 34 defining space 46 of pocket 44 includes a liner or layer of material disposed thereon, which may comprise a plastic or nylon insert secured or engaged within pocket 44 further defining the space 46. Grommets 36 may be formed in the liner or layer of material disposed on surface 48.

Figure 6:
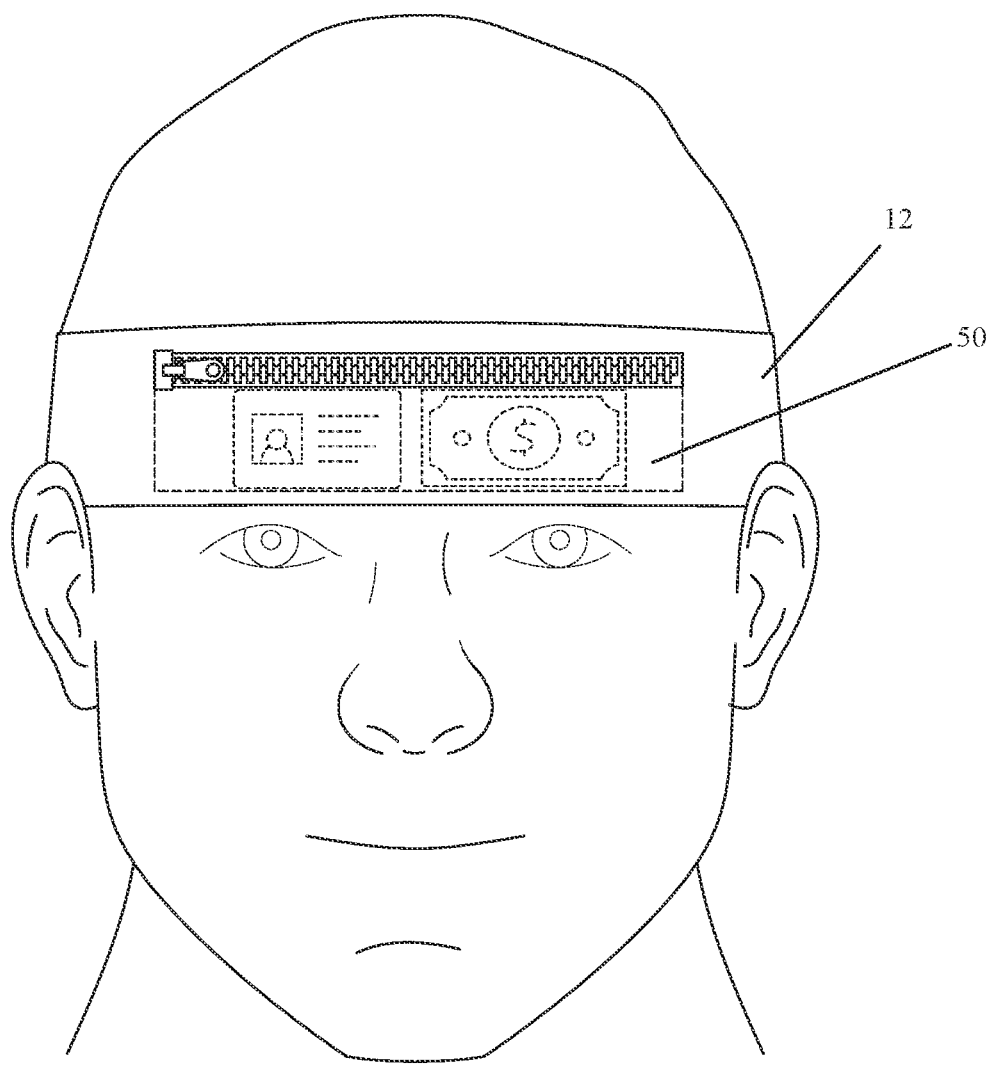
FIG. 6 illustrates a front view of the apparatus of FIG. 1, illustrating a second pocket included in the headband.

As shown in FIG. 6, in some embodiments headband 12 further includes a sealable pocket 50 for storing items such as identification cards and money. Sealable pocket 50 is formed in body 30, or disposed over body 30, such as over pocket 44. Sealable pocket 50 may be sealed in any conventional manner such as by a zipper as shown.

It should be understood that headband 12, including body 30, may be constructed of any suitable material, such as a water absorbent, stretchable material, made of elastic, standard cloth or a stretchable cloth material, or a hybrid or combination like a cotton and synthetic fiber mix. For example, body 30 may be formed of a sponge or spongelike material and/or entirely rubber-coated or rubber-coated in parts, such as in the area of pocket 44. Headband 12 may be configured to partially or fully extend about a human head when worn by a user.

Figure 7:
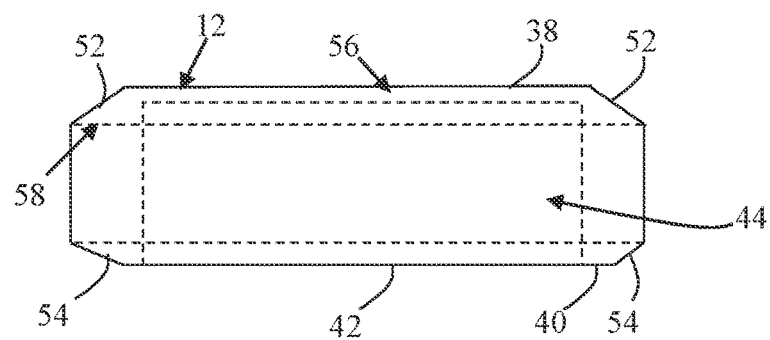
FIG. 7 illustrates a front view of the apparatus of FIG. 1, illustrating the width in the area of the pocket section being greater than the width of the headband in a non-pocket section.

As shown in FIG. 7, in some embodiments, the portion of headband 12 having pocket 44 therein has a greater axial width (between first edge 38 and second edge 40) as compared with the remaining portion of headband 12, which may enable pocket 44 to accommodate various types of eyeglasses 14, among other things. Headband 12 may include upper tapered portions 52 and/or lower tapered portions 54 of headband 12 adjacent to opposing circumferential sides of pocket 44 which facilitate the transition from the wider pocket area 56 of headband 12 to the less wide section 58 of headband 12. In addition, the radial width of body 30 in the area of pocket 44 may be thicker than the remaining radial width of body 30.

Eyeglasses 14 may be any eyeglasses, including sunglasses such as polarized sunglasses. The eyeglasses may also be configured as protective glasses, such as work glasses, goggles or sport glasses, which are designed for user safety or to protect the user from injury, such as injury caused by impact. The eyeglasses may be constructed of a lightweight material, such as polycarbonate. In some embodiments, the eyeglasses have interchangeable lens. In some embodiments, the eyeglasses are rounded along the bottom edge to avoid potential contact of a sharp edge with a user's face.

Connectors 16*a*, 16*b*, and 16*c*, may be any suitable material, such as an elastic, resilient material or rigid plastic member. In some embodiments, connectors 16*a*, 16*b* and 16*c* may be configured with engagement members at first ends 20 to enable forming an engagement with any eyeglasses.

In some embodiments, an area is defined on body 30, such as in the area of pocket 44, for indicia to be disposed thereon, such as text or graphics, which may be used for promotional or marketing purposes. The indicia may be disposed on the headband by any conventional method, such as direct-to-garment spraying, printing (such as screen printing or transfer printing) or the indicia may be disposed on the headband by first being on a patch or substrate of material which is then adhered sewn onto the headband, for example.

It should be understood that no limitation of the scope of the invention is intended by the examples provided. It should also be understood that the aforementioned embodiments of the invention may be of any size or shape. Any alterations and further modifications of any inventive feature illustrated herein, and any additional applications of the principles of the invention as illustrated herein which would normally occur to one skilled in the relevant art and having possession of this disclosure are to be considered within the scope of the invention claimed.

This written description uses examples to disclose the invention and also to enable any person skilled in the art to practice the invention, including making and using any devices or systems and performing any incorporated methods. The patentable scope of the invention is defined by the claims, and include other examples that occur to those skilled in the art. Other aspects and features of the invention can be obtained from a study of the drawings, the disclosure, and the appended claims. The invention may be practiced otherwise than as specifically described herein and within the scope of the appended claims. It should also be noted, that the steps and/or functions listed herein and within the appended claims, notwithstanding the order of which steps and/or functions are listed therein, are not limited to any specific order of operation.

While exemplary apparatus, systems and methods of the invention have been described herein and in the accompanying documents, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, by the claims and any equivalents thereto.

The invention claimed is:

1. An eyeglasses and headband combination apparatus comprising:
a headband having an annular shape and being configured and dimensioned to be worn on the head of a user, wherein the headband includes a first portion and a second portion, the first portion including a circumferential pocket spanning the forehead area and being defined between a first wall and a second wall, the walls having one or more grommets therein that pass through the pocket and guide the eyeglasses as it glides into and out of the storage pocket;
eyeglasses attachable to the headband, the eyeglasses including a bridge position, a first lens position and a second lens position; and
one or more connectors, each of the one or more connectors having an elongated body defining a first end and a second end, the first end opposing the second end, the first end of each of the one or more connectors being attached to at least one of the bridge position, the first lens position and the second lens position, the elongated body of each of the one or more connectors extending through the grommet, wherein the elongated body is movable through the grommet to a first condition whereby in the first condition the eyeglasses are stored in the pocket, and movable to a second condition whereby in the second condition the eyeglasses are extended from the pocket, wherein the second end of each of the one or more connectors is secured to the grommet whereby each of the one or more connectors is non-removable from headband, wherein the first portion of the headband has a first axial width and the second portion of the headgear has a second axial width, the first axial width being greater than the second axial width, and wherein the headband further comprises a first upper tapered portion adjacent to a first circumferential side of the first portion, a second upper tapered portion adjacent to a second circumferential side of the first portion, a first lower tapered portion adjacent to the first circumferential side of the first portion and a second lower tapered portion adjacent to the second circumferential side of the first portion, the first circumferential side of the first portion and the second circumferential side of the first portion being positioned on opposing circumferential sides of the first portion.

2. The eyeglasses and headband combination apparatus of claim 1, wherein the second end is of a greater diameter than the grommet and the elongated body.

3. The eyeglasses and headband combination apparatus of claim 1, wherein the first end of the one or more connectors is non-permanently attached with the at least one of the bridge position, the first lens position and the second lens position.

4. The eyeglasses and headband combination apparatus of claim 1, wherein the first end of the one or more connectors is permanently attached with the at least one of the bridge position, the first lens position and the second lens position.

5. The eyeglasses and headband combination apparatus of claim 1, further comprising a second pocket, the second pocket being accessible on a surface of the headband.

6. The eyeglasses and headband combination apparatus of claim 1, further comprising an area defined on a surface of the headband for indicia to be disposed thereon.

7. An eyeglasses and headgear combination apparatus comprising:

a headgear configured and dimensioned to be worn by a user, wherein the headgear includes a first portion and a second portion, the first portion including a pocket defined between a first wall and a second wall, the second wall having one or more grommets therein;

eyeglasses attachable to the headgear, the eyeglasses including a bridge position, a first lens position and a second lens position; and one or more connectors, each of the one or more connectors having an elongated body defining a first end and a second end, the first end opposing the second end, the first end of each of the one or more connectors being attached to at least one of the bridge position, the first lens position and the second lens position, the elongated body of each of the one or more connectors extending through the grommet, the second end being of a greater diameter than the grommet and the elongated body, wherein the elongated body is movable through the grommet to a first condition whereby in the first condition the eyeglasses are stored in the pocket, and movable to a second condition whereby in the second condition the eyeglasses are extended from the pocket, wherein the second end of each of the one or more connectors is secured to the grommet whereby each of the one or more connectors is non-removable from headgear, wherein the first portion of the headgear has a first width and the second portion of the headgear has a second width, the first width being greater than the second width, and wherein the headgear further comprises a first upper tapered portion adjacent to a first side of the first portion, a second upper tapered portion adjacent to a second side of the first portion, a first lower tapered portion adjacent to the first side of the first portion and a second lower tapered portion adjacent to the second side of the first portion, the first side of the first portion and the second side of the first portion being positioned on opposing sides of the first portion.

8. The eyeglasses and headgear combination apparatus of claim 7, wherein the first end of the one or more connectors is non-permanently attached with the at least one of the bridge position, the first lens position and the second lens position.

9. The eyeglasses and headgear combination apparatus of claim 7, wherein the first end of the one or more connectors is permanently attached with the at least one of the bridge position, the first lens position and the second lens position.

10. The eyeglasses and headgear combination apparatus of claim 7, wherein the headgear comprises a headband.

11. The eyeglasses and headgear combination apparatus of claim 10, wherein the headband is annular.

12. An eyeglasses and headband combination apparatus comprising:

a headband having an annular shape being configured and dimensioned to be worn on the head of a user, wherein the headband includes a first portion and a second portion, the first portion including a pocket defined between a first wall and a second wall, the first wall and second wall being connected by one or more grommets therein;

eyeglasses attachable to the headband, the eyeglasses including a bridge position, a first lens position and a second lens position; and one or more connectors, each of the one or more connectors having an elongated body defining a first end and a second end, the first end opposing the second end, the first end of each of the one or more connectors being permanently attached to at least one of the bridge position, the first lens position and the second lens position, the elongated body of each of the one or more connectors extending through the grommet, the second end being of a greater diameter than the grommet and the elongated body, wherein the elongated body is movable through the grommet to a first condition whereby in the first condition the eyeglasses are stored in the pocket, and movable to a second condition whereby in the second condition the eyeglasses are extended from the pocket, wherein the second end of each of the one or more connectors is secured to the grommet whereby each of the one or more connectors is non-removable from headband, and wherein the headband has a first width and a second width, the first width being in the first portion of the headband with the pocket, wherein the first width is greater than the second width and wherein the headband further comprises a first upper tapered portion adjacent to a first side of the first portion, a second upper tapered portion adjacent to a second side of the first portion, a first lower tapered portion adjacent to the first side of the first portion and a second lower tapered portion adjacent to the second side of the first portion, the first side of the first portion and the second side of the first portion being positioned on opposing sides of the first portion.

13. The eyeglasses and headband combination of claim 12 wherein the headband is constructed of a material having a property of being water absorbent.

14. The eyeglasses and headband combination of claim 12 wherein the headband is constructed of a material having a property of being elastic.

15. The eyeglasses and headband combination of claim 12 wherein the eyeglasses further comprises a polarized lens.

16. The eyeglasses and headband combination apparatus of claim 1, further comprising an area defined on an outer surface of the portion of the headband with the pocket for indicia to be disposed thereon.

* * * * *